Aug. 1, 1961　　　J. H. KARK ET AL　　　2,994,226
LINEAR DISPLACEMENT TRANSDUCER
Filed Sept. 1, 1959
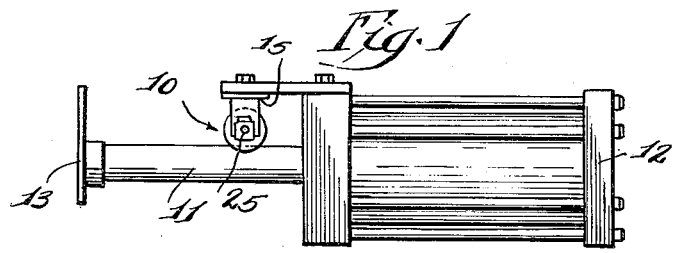
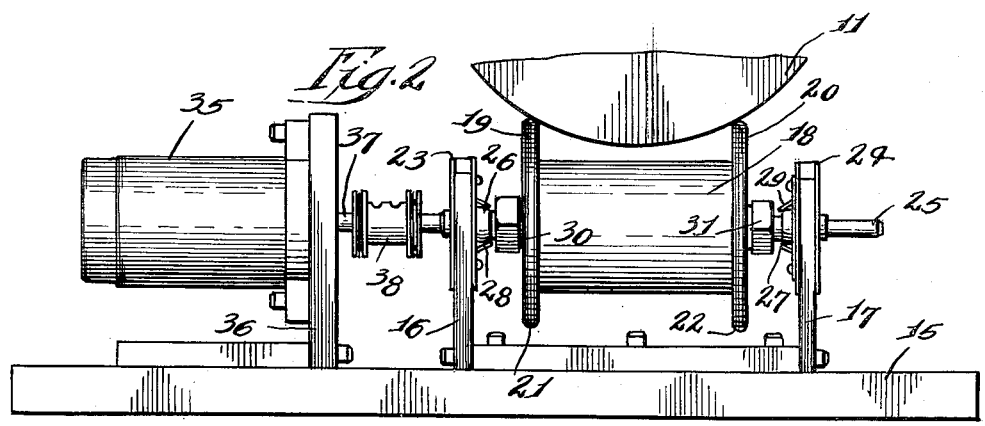
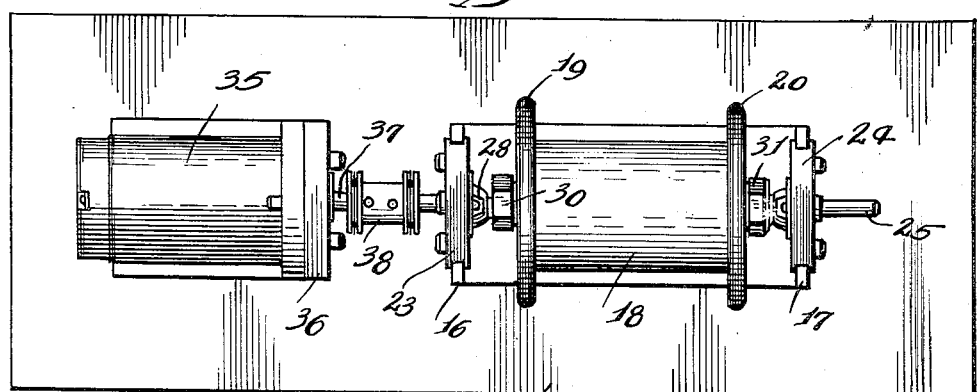
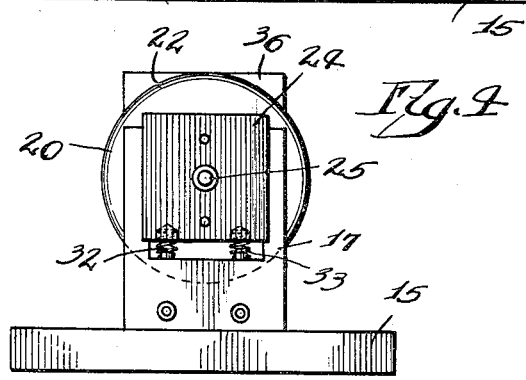
Inventors
James H. Kark
Charles O. Breitsprecher
Donald M. Bornarth
Hofgren, Brady, Wegner,
Allen + Stellman
Attorneys 2,994,226
LINEAR DISPLACEMENT TRANSDUCER
James H. Kark and Charles O. Breitsprecher, Racine, Wis., and Donald M. Bornarth, Chicago, Ill., assignors to Racine Hydraulics and Machinery, Inc., a corporation of Wisconsin
Filed Sept. 1, 1959, Ser. No. 837,456
7 Claims. (Cl. 74—90)

This invention relates to a magnetic drive mechanism and more particularly to a linear displacement transducer embodying the magnetic drive mechanism.

An object of the invention is to provide a positive, accurate drive for a rotary motion device having its movement directly related to the movement of a flat, curved or irregular surface having magnetic properties.

Another object of the invention is to provide a mechanism for the conversion of a linear to a rotary movement which is accomplished by a magnetic drive mechanism in which a magnet unit has a pair of pole pieces for engagement with spaced points on a linear movable member such as a hydraulic cylinder rod and structure is provided for supporting said magnetic unit whereby the parts engaging with the rod are always in alignment for best frictional engagement and a closed magnetic path with said rod.

Another object of the invention is to provide an apparatus for accurately detecting the displacement of a member such as a hydraulic cylinder rod comprising, a spool-shaped magnet unit extending transversely to the axial length of said member and rollingly engageable therewith, said unit having a pair of spaced apart pole pieces engageable with spaced apart points on said member and a permanent magnet between the pole pieces, means mounting said unit for rolling and floating movement including a shaft carrying said unit, and a rotary position detector connected to said shaft.

Further objects and advantages will become apparent from the following detailed description taken in connection with the accompanying drawings in which:

FIG. 1 is a side elevational view of a hydraulic cylinder having the linear displacement transducer associated therewith;

FIG. 2 is a side elevational view of the linear displacement transducer with a movable member in association therewith and with the linear displacement transducer inverted from the position shown in FIG. 1 and on an enlarged scale;

FIG. 3 is a plan view of the structure shown in FIG. 2 with the linear movable member omitted; and FIG. 4 is an end view looking toward the right hand end of FIG. 2.

While this invention is susceptible of embodiments in many different forms, there is shown in the drawings and will herein be described in detail an embodiment of the invention with the understanding that the present disclosure is to be considered as an exemplification of the principles of the invention to the embodiment illustrated. The scope of the invention will be pointed out in the appended claims.

As shown in FIG. 1 a linear displacement transducer indicated generally at 10 is associated with a linearly movable member. The member is disclosed as a piston rod 11 associated with a hydraulic cylinder 12 although the member might be flat or have an irregular contour. The cylinder 12 is utilized for operating any desired device by suitable connections to an end 13 of the rod and the transducer 10 gives an accurate indication as to the displacement of the rod 11 and the instantaneous position thereof.

As shown in FIGS. 2, 3, 4, the device has a base 15 on which are mounted a pair of spaced apart forked supports 16 and 17. The supports 16 and 17 carry a magnetic drive unit having a spool-shape with a magnet 18, preferably a permanent magnet, and a pair of spaced apart disc-shaped pole pieces 19 and 20 having rounded peripheral edges 21 and 22, respectively. The pole pieces 19 and 20 are in frictional engagement with the member 11 and with the member 11 of magnetically permeable material a magnetic circuit is established through the member 11 and pole pieces 19 and 20 with one pole piece being a North pole and the other a South pole. This results in the pole pieces 19 and 20 being in both frictional and magnetic relation with the member 11 to insure an accurate rotary movement of the magnetic drive unit in correspondence to the linear movement of the member 11. As noted in FIG. 2, the pole pieces 19 and 20 engage the member 11 at circumferentially spaced apart points and a part of the member 11 therebetween lies in the space formed by the magnet 18 being of a diameter less than the pole pieces 19 and 20.

The rounded peripheral edges of the pole pieces 19 and 20 result in having the contact with the member 11 more nearly like a surface contact in so far as the magnetic attraction is concerned since there is less of an air gap between the pole pieces and the member 11. This results in lessening the possibility of slippage and wear in the pole pieces.

It is important for an accurate determination of the linear movement of member 11 that the engagement of the member 11 with the pole pieces 19 and 20 always be at a fixed distance from the axis of rotation of the pole pieces. Means for obtaining this result comprise a floating mounting for the magnetic drive unit which will enable one pole piece to go faster than the other if the member 11 should be off center to thus shift the magnetic drive unit onto center relative to the member 11.

The mounting for the magnetic drive unit comprises a pair of members 23 and 24 slidably mounted one on each of the supports 16 and 17. A mounting shaft 25 of non-magnetic material extends between the members 23 and 24 and is rotatably mounted therein by self-aligning universal bearings having outer races 26 and 27 confined by spring clips having a series of bent out tabs 28 and 29. The magnetic unit is securely held together and on the shaft 25 by means of a pair of brass nuts 30 and 31 threaded on the shaft 25.

Means are provided for resiliently urging the drive unit pole pieces 19 and 20 into engagement with the member 11 comprising a pair of springs 32 and 33 extending between each of the supports 16 and 17 and their respective members 23 and 24.

A rotary transducer 35 is supported on the base 15 by a frame 36 and has its input shaft 37 connected to an extension of the shaft 25 by a flexible coupling 38 whereby the rotary transducer 35 is driven from the magnetic drive unit in any position of the latter.

It will be seen from the foregoing that relatively long linear movement may simply be converted to rotary movement by a magnetic drive unit with the coaction between the pole pieces and the curved surface of the driving member maintaining the interengaging parts always in alignment for best frictional engagement and a closed magnetic path. Specifically the structure disclosed herein may convert linear motion to rotary motion to drive the rotary transducer 35 which may be a synchro, a potentiometer, a tachometer, a commutator or some other similar element.

We claim:

1. Apparatus for accurately detecting the position of a hydraulic cylinder rod magnetically permeable material comprising: a magnetic spool-shaped unit extending transversely to the axial length of the rod and rollingly engageable with said rod, said unit having a pair of spaced apart pole pieces engageable with circumferentially spaced points on said rod, and a permanent magnet between said pole pieces of a perimeter less than said pole pieces to provide a space for receiving a part of the rod between said circumferentially spaced points; means mounting said unit for rotation and floating movement including a shaft carrying said unit: a rotary position detector; and a flexible coupling between said shaft and said detector.

2. A linear displacement transducer for a hydraulic cylinder rod comprising, a base with a pair of spaced apart supports, a shaft spanning said supports and journalled in members movably mounted on said supports, a permanent magnet carried on said shaft and having a pair of disc-like pole pieces across the ends of the magnet and extending beyond the magnet periphery to form with the magnet a spool-shaped unit, said magnet extending transversely to said rod whereby the pole pieces engage the rod at two rod locations spaced circumferentially thereof, a rotary transducer connected to said shaft, and means for urging said members toward the rod to ensure good frictional engagement between the pole pieces and said rod, said pole pieces having a rounded periphery to reduce the air gap between the pole pieces and rod.

3. Apparatus for accurately detecting the position of a linearly movable member comprising: a magnetic spool-shaped unit extending transversely to the axial length of the member and rollingly engageable therewith, said unit having a pair of spaced apart pole pieces engageable with spaced points on said member, and a permanent magnet between said pole pieces of a perimeter less than said pole pieces to provide a space capable of receiving a part of the member between said spaced points; means mounting said unit for rotation and floating movement including a shaft carrying said unit; and a rotary position detector connected to said shaft.

4. A linear displacement transducer for a linearly movable element comprising, a base with a pair of spaced apart supports, a shaft spanning said supports and journaled in members movably mounted on said supports, a magnet carried on said shaft and having a pair of disc-like pole pieces across the ends of the magnet, said magnet extending transversely to said element whereby the pole pieces engage the element at two spaced locations, a rotary transducer connected to said shaft, and means for urging said members toward the element to ensure good frictional engagement between the pole pieces and said linearly movable element.

5. Mechanism for converting a linear movement to a rotary movement comprising: a base, a pair of spaced apart supports on said base, a pair of members slidably mounted one in each of supports, a nonmagnetic shaft extending between said members, universal bearings rotatably mounting said shaft for movement relative to said members, a magnetic unit mounted on said shaft intermediate said members, said unit having a magnet and a pair of spaced apart disc-shaped pole pieces each with a rounded peripheral edge for magnetic and frictional contact with a linearly movable member of magnetically permeable material spanning said pole pieces, and means urging said members in a direction to maintain said pole piece frictional contact.

6. A linear displacement transducer for a longitudinally movable member comprising a base, a magnet having a pole piece rollingly engageable with said member, a shaft supporting said magnet and pole piece, means mounting said shaft on said base for rotation and for movement toward and away from the base, means resiliently urging said magnet and pole piece toward said member, and a rotary transducer connected to said shaft.

7. In combination, a linearly movable member and a displacement transducer for measuring the displacement of said member, said transducer comprising, a rotatable non-magnetic shaft, a magnetic unit mounted on said shaft, said unit having a magnet and a pair of spaced apart disc-shaped pole pieces for magnetic and frictional contact with the linearly movable member spanning said pole pieces, and a rotary position transducer operatively connected to said shaft.

References Cited in the file of this patent

UNITED STATES PATENTS

| | | |
|---|---|---|
| 848,628 | Brown | Apr. 2, 1907 |
| 1,826,603 | Dayton | Oct. 6, 1931 |
| 2,505,521 | Boyajian | Apr. 25, 1950 |
| 2,573,506 | Stokes | Oct. 30, 1951 |
| 2,817,242 | Gray | Dec. 24, 1957 |

FOREIGN PATENTS

| | | |
|---|---|---|
| 836,115 | Germany | Apr. 7, 1952 |
| 898,239 | Germany | Nov. 30, 1953 |